(12) United States Patent
Tabatabaee et al.

(10) Patent No.: US 12,199,873 B2
(45) Date of Patent: Jan. 14, 2025

(54) SCALABLE E2E NETWORK ARCHITECTURE AND COMPONENTS TO SUPPORT LOW LATENCY AND HIGH THROUGHPUT

(71) Applicant: Avago Technologies International Sales Pte. Limited, Singapore (SG)

(72) Inventors: Vahid Tabatabaee, San Jose, CA (US); Niranjan Vaidya, San Jose, CA (US); Chih-Yuan Chang, Palo Alto, CA (US); Mark David Griswold, Fremont, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 18/343,808

(22) Filed: Jun. 29, 2023

(65) Prior Publication Data

US 2023/0344769 A1    Oct. 26, 2023

Related U.S. Application Data

(63) Continuation of application No. 17/390,352, filed on Jul. 30, 2021, now Pat. No. 11,729,099.

(51) Int. Cl.
*H04L 47/12*    (2022.01)
*H04L 12/46*    (2006.01)

(52) U.S. Cl.
CPC .......... *H04L 47/12* (2013.01); *H04L 12/4633* (2013.01)

(58) Field of Classification Search
None
See application file for complete search history.

(56) References Cited

U.S. PATENT DOCUMENTS

| | | | |
|---|---|---|---|
| 2006/0087989 A1 | 4/2006 | Gai et al. | |
| 2015/0222533 A1 | 8/2015 | Birrittella et al. | |
| 2018/0332293 A1* | 11/2018 | Park | H04N 19/89 |
| 2021/0320820 A1* | 10/2021 | Ruan | H04L 49/602 |
| 2023/0046350 A1* | 2/2023 | Beecroft | H04L 47/6275 |

OTHER PUBLICATIONS

European Search Report on EP Appln. 22187010.8 dated Jan. 9, 2023.
Non-Final Office Action on U.S. Appl. No. 17/390,352 DTD Oct. 31, 2022.
Notice of Allowance on U.S. Appl. No. 17/390,352 DTD Mar. 24, 2023.

* cited by examiner

*Primary Examiner* — Hong Shao
(74) *Attorney, Agent, or Firm* — Foley & Lardner LLP

(57) ABSTRACT

A method for managing network traffic is shown. The method includes establishing a virtual tunnel between a source endpoint and a destination endpoint, the virtual tunnel including a plurality of data flow paths, each of the plurality of data flow streams connecting the source endpoint and the destination endpoint. The method includes providing, via the destination endpoint, a plurality of credits to the source endpoint, the plurality of credits provided via two or more of the plurality of data flow paths. The method includes updating, at the source endpoint, a data transmission sequence based on the received plurality of credits. The method includes providing a plurality of data packets based on the data transmission sequence to the destination endpoint.

20 Claims, 15 Drawing Sheets

SCALABLE E2E NETWORK ARCHITECTURE AND COMPONENTS TO SUPPORT LOW LATENCY AND HIGH THROUGHPUT

CROSS REFERENCE TO RELATED APPLICATIONS

This application is a continuation of U.S. patent application Ser. No. 17/390,352, filed on Jul. 30, 2021, the entire disclosure of which is incorporated by reference herein.

BACKGROUND

Certain network-based systems (e.g., data centers, Internet-based systems, etc.) may communicate by transporting data packets to and from various sources and endpoints. Several layers (e.g., transport layer, network layer, etc.) can be managed to control and improve the transmission and receiving of data packets, such as segmentation, error control, logical addressing, routing, path determination, and flow congestion management.

In certain systems, flow congestion can occur in the flow paths between networks, as a result of differing transmission and processing rates. For example, a smartphone is downloading a file from an off-premise server. The server can transmit data at a maximum of 100 Mbps, and the smartphone can process data at a maximum of 10 Mbps. The server sends data at 50 Mbps, causing congestion within the flow path. To remedy this, the smartphone (e.g., with the help of the transport layer, etc.) can instruct the server to decrease transmission rates to 10 Mbps.

Certain flow congestion management systems (e.g., those following the architecture outlined above, etc.) perform reactive management techniques that create a feedback loop to remove congestion, resulting in feedback delay and potential overshoot. Additionally, these techniques are not configured to be scalable, and are instead limited to the single flow path that is being managed.

DETAILED DESCRIPTION

Overview

Figure 1:
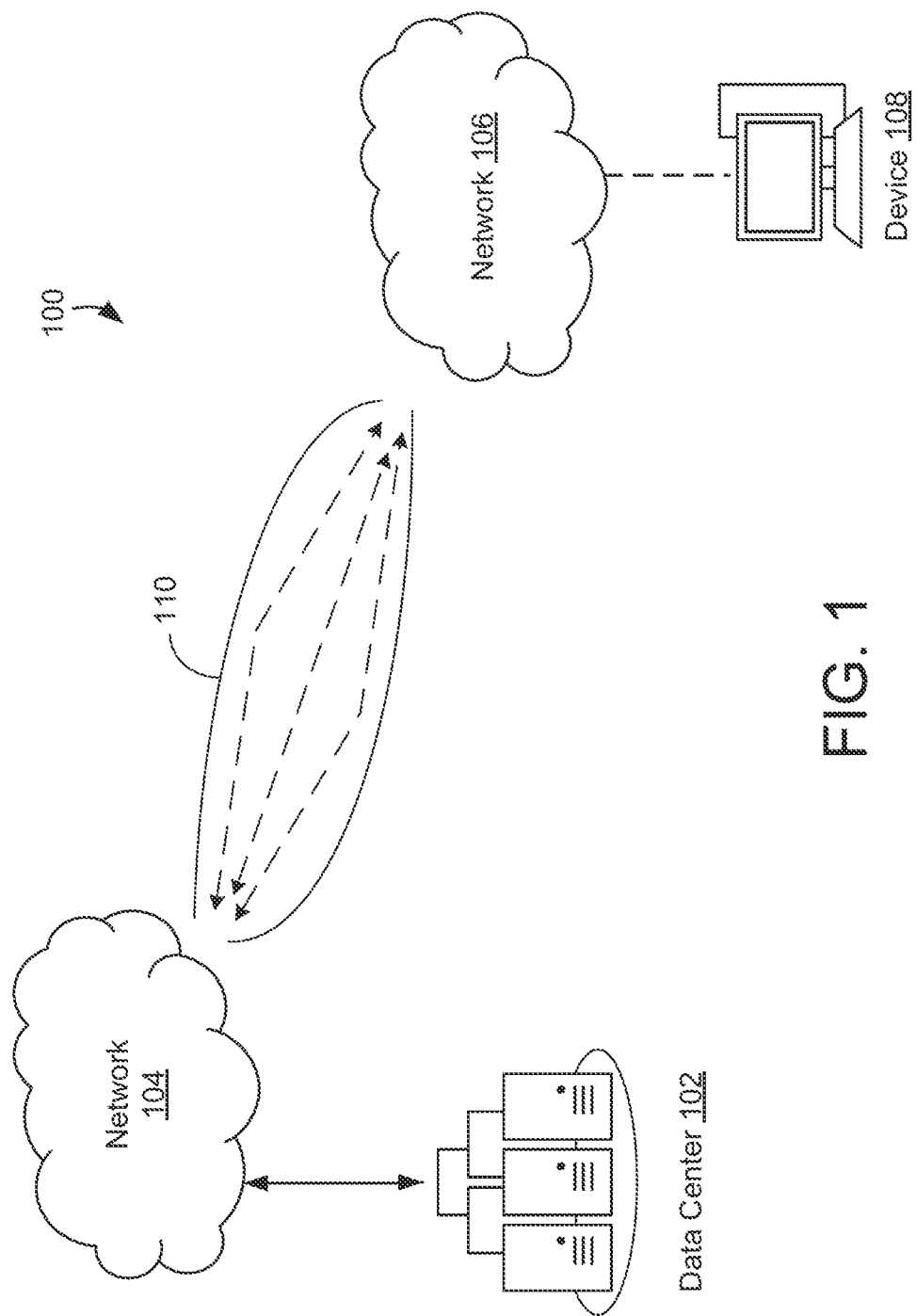
FIG. 1 is a high-level diagram of an inter-network system, according to some embodiments.

Referring generally to the FIGURES, systems and methods for implementing a virtual tunnel within an inter-network system are shown, according to some embodiments. The virtual tunnel may surround multiple flow paths, and provide a mechanism for manage data packet routing among the multiple flow paths, as opposed to within a single flow path between a source endpoint and a destination endpoint. Additionally, the systems and methods disclosed herein may include a routing management system that employs credit-based congestion prevention, allowing the virtual tunnel to significantly reduce congestion for the data packets. The credits may be provided by the destination to the source, allowing the source to adjust the scheduling/routing of the data packets to increase throughput and decrease latency. Finally, the systems and methods disclosed herein may also include several flow streams within the virtual tunnel (e.g., optimistic streams, scheduled streams, etc.) that provide another layer of mobility for routing the data packets from the source to the destination. In some embodiments, this results in a low-latency and scalable flow management system for data packet transmission that maintains high throughput.

Some embodiments summarized below are illustrative only and are not intended to be in any way limiting. Other aspects, inventive features, and advantages of the devices or processes described herein will become apparent in the detailed description set forth herein, taken in conjunction with the accompanying figures, wherein like reference numerals refer to like elements.

One embodiment of the present disclosure is a method for managing network traffic. The method includes establishing a virtual tunnel between a source endpoint and a destination endpoint, the virtual tunnel including a plurality of data flow paths, each of the plurality of data flow paths connecting the source endpoint and the destination endpoint. The method further includes receiving from the destination endpoint, a plurality of credits to the source endpoint, the plurality of credits provided via two or more of the plurality of data flow paths. The method further includes updating, at the source endpoint, a data transmission sequence based on the plurality of credits. The method further includes providing a plurality of data packets based on the data transmission sequence to the destination endpoint.

In some embodiments, providing the plurality of credits to the source endpoint includes generating the plurality of credits at generation rate, the generation rate based on a port rate of a destination network interface controller (NIC), the destination NIC configured to receive the plurality of data packets from the destination endpoint and provide the plurality of data packets to a destination server, determining that at least one credit received at the source endpoint is indicative of a non-congested data flow path of the plurality of data flow paths, wherein the at least one credit was provided to the source endpoint via the non-congested data flow path, and providing at least one data packet of the plurality of data packets to the destination endpoint via the non-congested data flow path.

In some embodiments, the method further includes establishing a first data stream and a second data stream within the virtual tunnel, using the first data stream to provide a first subset of the plurality of data packets to the destination endpoint, and using the second data stream to provide a second subset of the plurality of data packets to the destination endpoint, wherein the second data stream provides the second subset based on at least one of the plurality of credits.

In some embodiments, the method further includes generating, at the source endpoint, a first virtual order queue (VOQ) for the first data stream and a second VOQ for the second data stream, and scheduling two or more data packets of the plurality of data packets into either the first VOQ or the second VOQ based on flow path criteria, the flow path criteria indicating at least one of a priority requirement or latency requirement for the two or more data packets, wherein the data transmission sequence includes the first VOQ and the second VOQ.

In some embodiments, the method further includes receiving, at the destination endpoint, the first subset and the second subset, and reordering, at the destination endpoint, the plurality of data packets by combining the first subset and the second subset in an identical order from which the first subset and the second subset were provided.

In some embodiments, the method further includes receiving, at the destination endpoint, the first subset and the second subset, and reordering, at the destination endpoint, the plurality of data packets by combining the first subset and the second subset based on cross-stream reordering, wherein the cross-stream reordering is configured to notify the destination endpoint that the first subset is received prior to the second subset. In some embodiments, the first data stream is an optimistic stream and the second data stream is a scheduled stream.

In some embodiments, the data transmission sequence includes a transmission order for each of the plurality of data packets configured to be transmitted to the destination endpoint and a selected data flow stream of the plurality of data flow paths for each of the plurality of data packets.

In some embodiments, establishing the virtual tunnel includes establishing the virtual tunnel within a pre-existing network, the pre-existing network operating under a pre-existing transport layer protocol.

In some embodiments, receiving the plurality of credits at the source endpoint includes receiving the plurality of credits at a first credit rate and, in response to a determination of one or more congested data flow paths of the plurality of data flow paths, receiving the plurality of credits at a second credit rate.

In some embodiments, receiving the plurality of credits at the source endpoint includes receiving a shaped credit of the plurality of credits, the shaped credit shaped using one or more transit switches within the virtual tunnel and receiving an indication of a dropped credit of the plurality of credits, the dropped credit dropped using the one or more transit switches within the virtual tunnel.

In some embodiments, receiving the indication of the dropped credit includes receiving a negative-acknowledgement (NACK) at the source endpoint, the NACK indicating that a header of the dropped credit was received at the destination endpoint.

Another embodiment of the present disclosure is one or more non-transitory computer-readable media having computer-executable instructions stored thereon that, when executed by one or more processors, cause the one or more processors to perform operations. The operations include establishing a virtual tunnel between a source endpoint and a destination endpoint, the virtual tunnel including a plurality of data flow paths, each of the plurality of data flow paths connecting the source endpoint and the destination endpoint. The operations further include receiving from the destination endpoint, a plurality of credits to the source endpoint, the plurality of credits provided via two or more of the plurality of data flow paths. The operations further include updating, at the source endpoint, a data transmission sequence based on the plurality of credits. The operations further include providing a plurality of data packets based on the data transmission sequence to the destination endpoint.

In some embodiments, providing the plurality of credits to the source endpoint includes generating the plurality of credits at generation rate, the generation rate based on a port rate of a destination network interface controller (NIC), the destination NIC configured to receive the plurality of data packets from the destination endpoint and provide the plurality of data packets to a destination server, determining that at least one credit received at the source endpoint is indicative of a non-congested data flow path of the plurality of data flow paths, wherein the at least one credit was provided to the source endpoint via the non-congested data flow path, and providing at least one data packet of the plurality of data packets to the destination endpoint via the non-congested data flow path.

In some embodiments, the one or more processors are further configured to establish a first data stream and a second data stream within the virtual tunnel, using the first data stream to provide a first subset of the plurality of data packets to the destination endpoint, and using the second data stream to provide a second subset of the plurality of data packets to the destination endpoint, wherein the second data stream provides the second subset based on at least one of the plurality of credits.

In some embodiments, the one or more processors are further configured to generate, at the source endpoint, a first virtual order queue (VOQ) for the first data stream and a second VOQ for the second data stream and scheduling two or more data packets of the plurality of data packets into either the first VOQ or the second VOQ based on flow path criteria, the flow path criteria indicating at least one of a priority requirement or latency requirement for the two or more data packets. In some embodiments, the data transmission sequence includes the first VOQ and the second VOQ.

In some embodiments, the one or more processors are further configured to receive, at the destination endpoint, the first subset and the second subset and reorder, at the destination endpoint, the plurality of data packets by combining the first subset and the second subset in an identical order from which the first subset and the second subset were provided.

In some embodiments, the one or more processors are further configured to receive, at the destination endpoint, the first subset and the second subset and reorder, at the destination endpoint, the plurality of data packets by combining the first subset and the second subset based on cross-stream reordering, wherein the cross-stream reordering is configured to notify the destination endpoint that the first subset is received prior to the second subset. In some embodiments, the first data stream is an optimistic stream and the second data stream is a scheduled stream.

In some embodiments, the data transmission sequence includes a transmission order for each of the plurality of data packets configured to be transmitted to the destination endpoint and a selected data flow stream of the plurality of data flow paths for each of the plurality of data packets.

In some embodiments, establishing the virtual tunnel includes establishing the virtual tunnel within a pre-existing network, the pre-existing network operating under a pre-existing transport layer protocol.

Another embodiment of the present disclosure is a device for managing network traffic, the controller including one or more processors and memory storing instructions that, when executed by the one or more processors, causes the one or more processors to perform operations. The operations include establishing a virtual tunnel between a source endpoint and a destination endpoint, the virtual tunnel including a plurality of data flow paths, each of the plurality of data flow paths connecting the source endpoint and the destination endpoint. The operations include providing, via the destination endpoint, a plurality of credits to the source endpoint, the plurality of credits provided via two or more of the plurality of data flow paths. The operations include updating, at the source endpoint, a data transmission sequence based on the plurality of credits. The operations include providing a plurality of data packets based on the data transmission sequence to the destination endpoint. In some embodiments, establishing the virtual tunnel includes establishing the virtual tunnel within a pre-existing network, the pre-existing network operating under a pre-existing transport layer protocol.

In some embodiments, providing the plurality of credits to the source endpoint includes generating the plurality of credits at generation rate, the generation rate based on a port rate of a destination network interface controller (NIC), the destination NIC configured to receive the plurality of data packets from the destination endpoint and provide the plurality of data packets to a destination server, determining that at least one credit received at the source endpoint is indicative of a non-congestion via a data flow path of the plurality of data flow paths, and allowing at least one data packet of the plurality of data packets from being provided to the destination endpoint via the data flow path.

In some embodiments, the one or more processors are further configured to establish a first data stream and a second data stream within the virtual tunnel, use the first data stream to provide a first subset of the plurality of data packets to the destination endpoint, and use the second data stream to provide a second subset of the plurality of data packets to the destination endpoint, wherein the second data stream provides the second subset based on at least one of the plurality of credits. In some embodiments, the one or more processors are further configured to generate, at the source endpoint, a first virtual order queue (VOQ) for the first data stream and a second VOQ for the second data stream and schedule two or more data packets of the plurality of data packets into either the first VOQ or the second VOQ based on flow path criteria, the flow path criteria indicating at least one of a priority requirement or latency requirement for the two or more data packets, wherein the data transmission sequence includes the first VOQ and the second VOQ.

In some embodiments, the device is provided in an integrated circuit package.

Inter-Network System Overview

Referring now to FIG. 1, a diagram of an inter-network system 100 is shown, according to some embodiments. System 100 can refer to any type of system that provides transmission and/or receiving of data via data packet communication. System 100 is shown to include data center 102, network 104, network 106, device 108, and communications path 110. In some embodiments, system 100 advantageously implements low-latency and scalable flow management systems for data packet transmission while maintaining high throughput (e.g., successful message delivery over a communication channel, etc.).

Data center 102 can be any location (e.g., a building, a dedicated space within a building, a group of buildings, etc.) used to house computer systems and associated components (e.g., servers, telecommunications, storage systems, etc.). The systems and methods disclosed may be or include, either partially or entirely, processing within data center 102. While data center 102 is generally referred to as being at least one of the sources or destinations referred to herein, this is merely meant to be exemplary and should not be considered limiting. Several data centers may be considered (e.g., one data center acting as a source and one data center acting as a destination), or other types of network devices may act as the source and/or destination (e.g., another device, a terminal, a smartphone, etc.).

Network 104 (and similarly network 106) can any group of processing devices and computes capable of sharing resources (e.g., locally, provided by network nodes, etc.). A set of communication protocols (e.g., TCP/IP, etc.) may be used between the devices to communicate with one another and to provide/receive data. The nodes of network 104 may include personal computers, servers, networking hardware, or other specialized or general-purpose hosts. In some embodiments, the nodes are identified by hostnames and/or network addresses.

Communications path 110 may be configured to facilitate communications between network 104 and network 106. In some embodiments, communications path 110 includes one or more virtual tunnels. In some embodiments, a virtual tunnel acts as a point-to-point connection between two points (e.g., a source point and a destination point, etc.). As discussed above, a virtual tunnel can be configured to contain several different routing paths for data packets, and allow for the management of the data transmission within the tunnel as a separate and scalable management technique. The advantages and techniques for implementing a virtual tunnel in system 100 is described in greater detail below.

Figure 2:
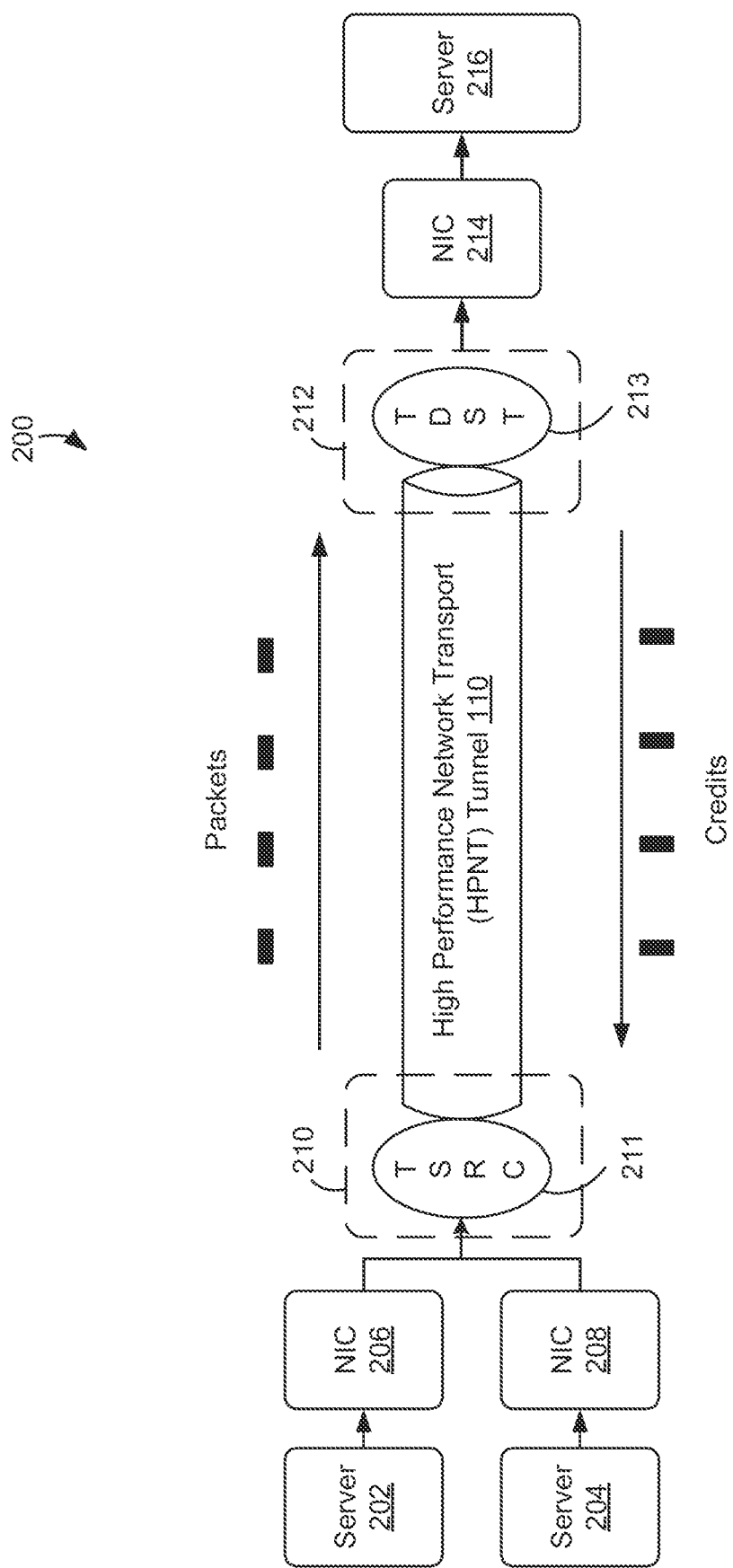
FIG. 2 is a diagram of a virtual tunnel, which can be implemented in the inter-network system of FIG. 1, according to some embodiments.

Referring now to FIG. 2, a diagram of system 200 a virtual tunnel is shown according to some embodiments. In some embodiments, system 200 shows data being provided from source-side serves (e.g., servers 202, 204) to destination-side servers (e.g., server 216). As mentioned above, the end devices described herein (e.g., server 202, server 216, etc.) are meant to be exemplary and should not be considered limiting. Any type of processing device and/or computing device may be considered. In some embodiments, system 200 includes systems and methods for establishing a virtual tunnel with top-or-rack (ToR) switches.

In some embodiments, ToR switching is a network architecture design in which computing equipment (e.g., servers, appliances, other switches, etc.) located within the same or adjacent "rack" are connected to an in-rack network switch. The in-rack network switch may, in turn, be connected to aggregation switches (e.g., via fiber optic cables, etc.). While the systems and methods disclosed herein generally contemplate virtual tunneling with ToR switch endpoints, other computer architectures can be considered, such as end-of-row (EoR) designs. System 200 is shown to include servers 202, 204, NICs 206, 208, source top-of-rack (S-ToR) switch 210, tunnel source 211, high performance network transport (HPNT) tunnel 110 ("tunnel 110"), destination top-of-rack (D-ToR) switch 212, tunnel destination (TDST) 213, NIC 214, and server 216.

In one example, server 202 provides several data packets to network interface controller (NIC) 206. NIC 206 can be provided in a single integrated circuit package. NIC 206 may provide the data packets to S-ToR switch 210. S-ToR switch 210 may include TSRC 211. In some embodiments, TSRC 211 acts as the source endpoint and includes a source address from which data packet(s) are provided from and credits are provided to. TSR1 212 may enqueue some or all packets originating from some or all attached NIC ports (e.g., ports of NIC 206, 208, etc.) into tunnel virtual output queues (VOQs) (not shown). In some embodiments, VOQ stands for virtual output queue, virtual order queue, or both. For the purposes of the disclosure herein, VOQ will stand for virtual order queue for the disclosed embodiments.

In some embodiments, visual output queueing may be a technique used in certain network switch architectures (e.g., system 200, etc.) wherein, rather than keeping all traffic within a single queue, separate queues are maintained for each possible output location. This can address common problems such as "head-of-line" blocking. In visual output queuing, the physical buffer of each input port can maintain a separate virtual queue for each output. Thus, congestion on an egress port may block only the virtual queue for this particular egress port, while other packets in the same physical buffer destined to different (non-congested) output ports can be in separate virtual queues and can therefore still be processed. Using alternative techniques, the blocked packet for the congested egress port may have blocked the entire physical buffer, resulting in head-of-line blocking.

Tunnel 110 may act as a virtual tunnel that allows "latency sensitive" (LS) flows between source-destination pairs (e.g., S-ToR 210, D-ToR 213, etc.), which can be coupled to and/or include the ports connecting the source/destination to the respective NIC (e.g., SRC 211, TDST 213, etc.). In some embodiments, tunnel 110 is established between S-ToR 210 and a port of D-ToR 212, which may be a link (e.g., a port) connecting D-ToR 212 and NIC 214.

Tunnel 110 may enclose several flow paths (e.g., 5, 10, etc.) such that data packet routing can be managed for some or all of the flow paths within tunnel 110, rather than just a single data flow path. In a general embodiment, TSRC 211 schedules and adds tunnel headers to data packets from some or all of the flows that are routed to go to TDST 213 (the scheduling of packets can be subject to receiving credits from the tunnel destination). Additionally, TDST 213 may send credit messages and other control messages—such as acknowledgement (ACK) signals and/or negative acknowledgment (NACK) signals—to the source (e.g., TSRC 211). The credit generation rate can be controlled by a congestion control algorithm, among other techniques (details regarding the credit generation rate and credit process are described in greater detail below). TDST 213 may also reorder packets received from the tunnel and deliver them to the flow destination (e.g., NIC 214, etc.).

Several data flow paths (e.g., path from server 202 to TSRC 211, path from server 204 to TSRC 211, etc.) enter into TSRC 211. There, S-ToR switch 210 and/or TSRC 211 may enqueue all packets originating from all attached NIC ports into the tunnel VOQs and schedule packets from the VOQs into tunnel 110. Additionally, TDST 213 can send credits and control packets (e.g., ACK, NACK, etc.) back to TSRC 211. In some embodiments, in-order-delivery is required and TDST 213 reorders packets received via tunnel 110 and delivers them to NIC 214 in the proper order. NIC 214 may provide the ordered data packets to server 216 to complete the data transmission. In some embodiments, the data is provided by the source servers (e.g., servers 202, 204, etc.) to S-ToR 210 in order. In some embodiments, NIC 214 receives packet in order from D-ToR 212. In some embodiments, once a credit is received at the source, this is indicative that the source is allowed to send one or more data packets to the destination without causing congestion in the network.

Figure 3:
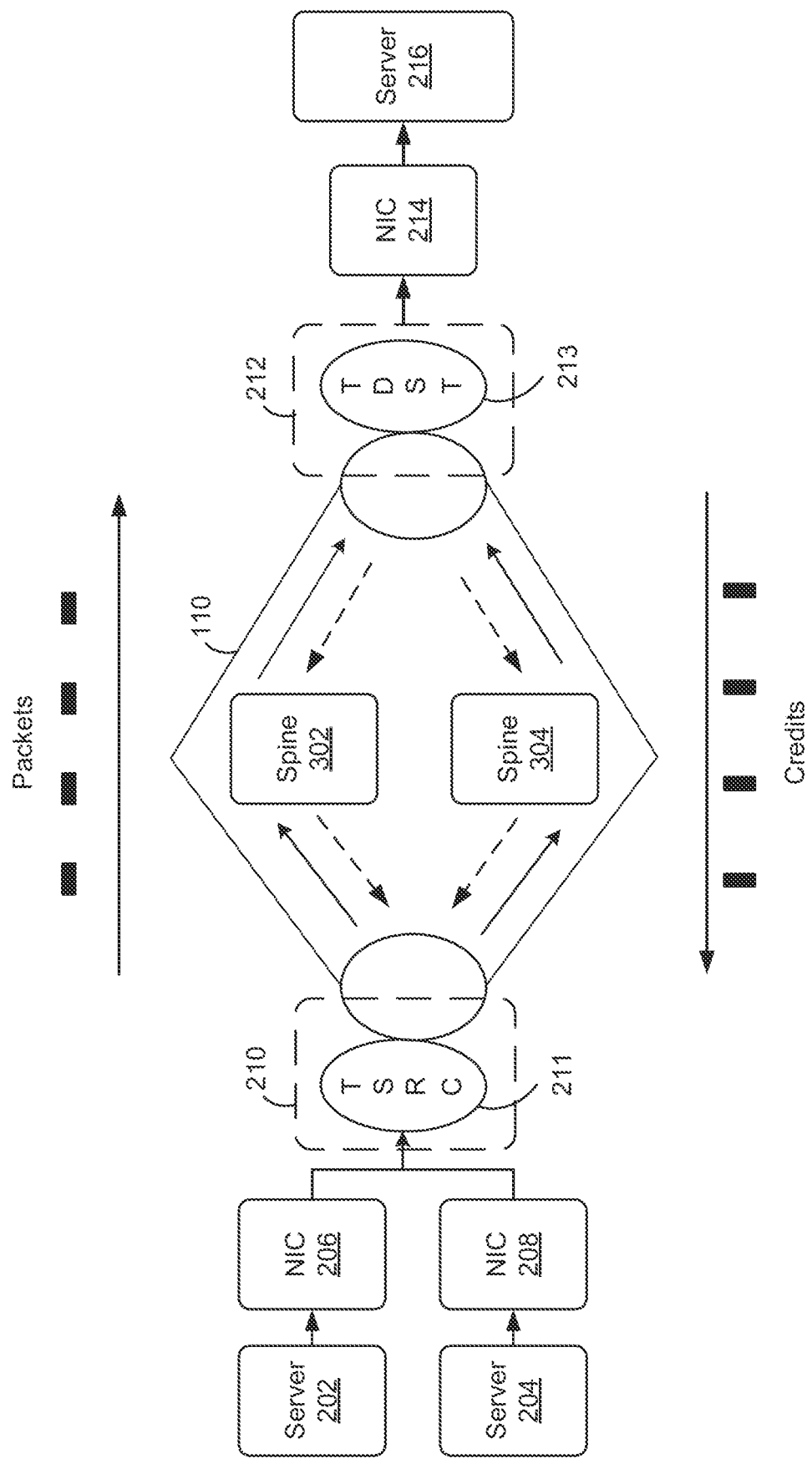
FIG. 3 is a diagram of a virtual tunnel with multiple flow paths, which can be implemented in the inter-network system of FIG. 1, according to some embodiments.

Referring now to FIG. 3, another implementation of system 200 is shown, according to some embodiments. FIG. 3 shows tunnel 110 including several spines (e.g., spines 302, 304) and multiple flow paths going to and from TSRC 211 and TDST 213. Spines 302 and 304 may act as midpoints or connection nodes between TSRC 211 and TDST 213 that allows the several data packets following several data flow paths to connect at one or more nodes during the routing to TDST 213. As discussed above, multiple paths can be used for sending data packets within tunnel 110.

Virtual Tunnel with Multiple Streams

Figure 4:
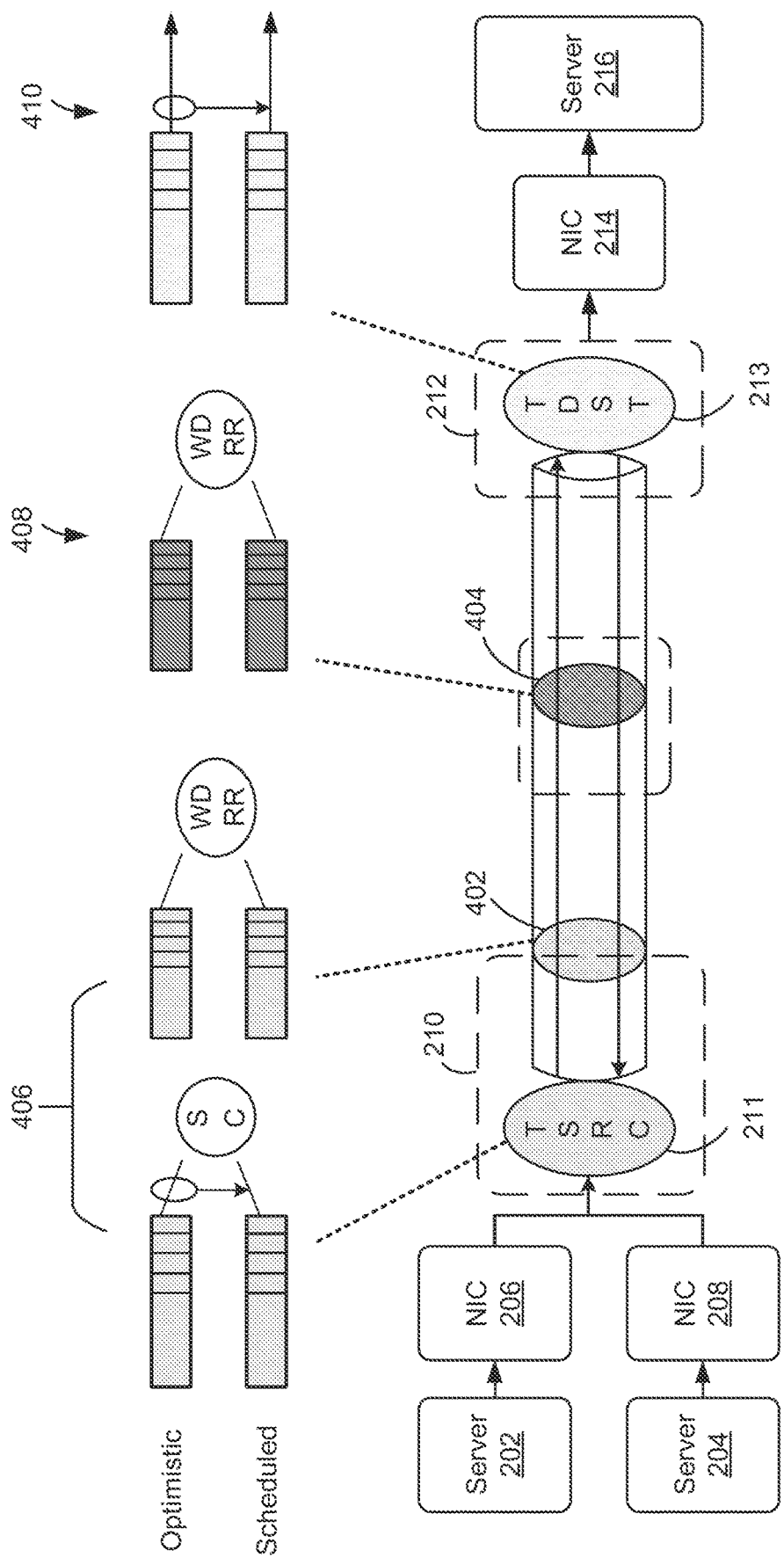
FIG. 4 is a diagram of a virtual tunnel with two flow streams, which can be implemented in the inter-network system of FIG. 1, according to some embodiments.

Referring now to FIG. 4, another implementation of system 200 is shown, according to some embodiments. FIG. 4 shows tunnel 110 including two separate streams: an optimistic stream and a scheduled stream. In some embodiments, the optimistic stream is used by high priority and extra-low latency traffic that should primarily be used for the first initial packets (e.g., K packets) of each flow. In some embodiments, the scheduled stream is used for typical low latency traffic that can/always use credits from the receiver to send packets. The queuing, scheduling, and/or reordering for the data packets is performed per stream, in some embodiments. FIG. 4 shows tunnel 110 including regions, 402, 404 and diagrams 406, 408, and 410.

In the first diagram (diagram 406), the two streams are shown at TSRC 211. At this stage, S-ToR 210 may create VOQs for each stream, such that there is an optimistic stream VOQ and a scheduled stream VOQ (this can be seen in diagram 406, left). Diagram 406 also shows separate output queues for each stream (this can be seen in diagram 406, right). In the second diagram (diagram 408), the two streams are shown at region 402. At this stage, a transit switch shows separate output queues. Finally, diagram 410 shows separate reordering contexts for both streams at TDST 213.

In some embodiments, several modes of providing the data packets through several streams can be considered, such as push mode and pull mode. In push mode, packets can be scheduled without waiting for credits in the optimistic stream. In pull mode, either the optimistic stream and/or the scheduled stream becomes active for scheduling only upon receiving credit for the tunnel. Thus, the scheduled stream is always in pull mode, and the optimistic stream mode changes based on the congestion state reported by the destination (e.g., TDST 213), in some embodiments. The optimistic stream may start "fast" (e.g., transmitting at a high rate, etc.) and push traffic with little to no wait; if there is congestion, the optimistic stream may back off to the pull mode. For example, a new tunnel session starts (enter pull mode). TDST 213 signals that the tunnel is congested (enter pull mode). TDST 213 signals that the tunnel congestion is relieved (enter push mode).

Figure 5:
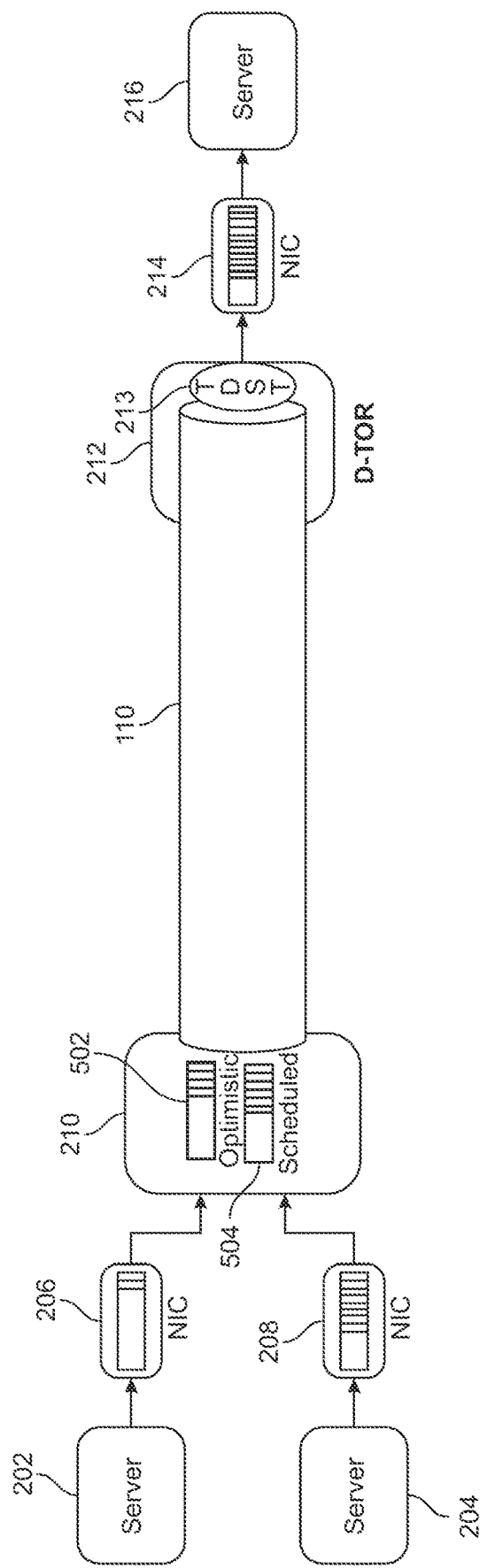
FIG. 5 is a diagram of a virtual tunnel with two flow streams, which can be implemented in the inter-network system of FIG. 1, according to some embodiments.

Referring now to FIG. 5, another implementation of system 200 is shown, according to some embodiments. FIG. 5 may show a non-limiting use case embodiment of implementing multiple streams within tunnel 110. For example, an NIC/server (e.g., server 204) tracks the transmission bytes of each flow and sets a differentiated services code point (DSCP) bit differently for the first K bytes versus the rest of the bytes. S-ToR 210 uses the DSCP field to map the first K bytes of incoming flows to the optimistic stream, and the rest to the scheduled stream. This process is shown in FIG. 5, where optimistic stream 502 includes the first K bytes (first 2 bars) from NIC 208 and the rest of the bytes (last 6 bars) from NIC 208 are provided to the scheduled stream.

Following the above example, this can result in little to no round-trip-time (RTT) when there is no congestion within tunnel 110. The first bytes of flows are in the optimistic stream a provided in push mode when tunnel 110 is not congested, in some embodiments. In short flows (e.g., flows prioritizing completion time, etc.), only the optimistic stream may be used. In some embodiments, more than one optimistic stream and scheduled stream can be implemented, with different VOQs and therefore different scheduling occurring among the several streams.

Figure 6:
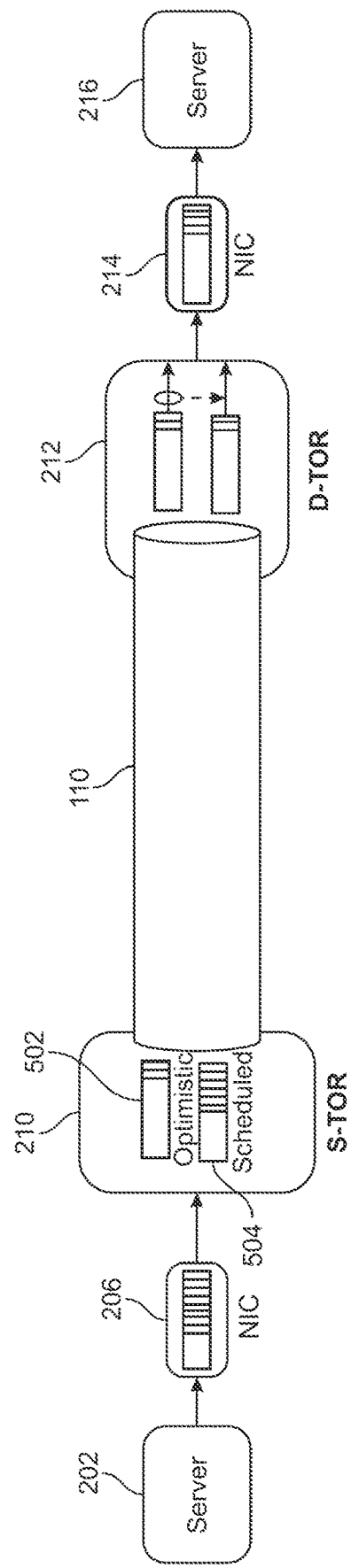
FIG. 6 is a diagram of a virtual tunnel with two flow streams, which can be implemented in the inter-network system of FIG. 1, according to some embodiments.

Referring now to FIG. 6, another implementation of system 200 is shown, according to some embodiments. FIG. 6 may show the reordering process that occurs at D-ToR 214 after the data packets are provided to the destination endpoint. In some embodiments, ordered packets may be transmitted through tunnel 110, which can require end-to-end (e2e) in-order delivery from system 200. The systems and methods for stream management described above with reference to FIG. 5 may occur at the stream level, but may also ensure proper in-order delivery after data transmission has been completed. This may be the case even for flows that start in optimistic stream and continue in the scheduled stream. Several reordering capabilities may be implemented, such as in stream reordering an cross-stream reordering. In some embodiments, an in-stream reordering technique is implemented, where packets of each stream are delivered in the same order that they enter the network. In some embodiments, a cross-stream reordering technique is implemented, where optimistic stream packets are delivered prior to scheduled stream packets that enter the network after them.

Tunnel 110 may provide a reliable communication model for transport. However, the link-level transmission between switches can be lossy and tunnel 110 may not use link-level flow control. The link-level flow control mechanisms (e.g., Ethernet-PFC, credit based FC, etc.) used in infiniband may not be well suited for LL traffic. HOL blocking can introduce unexpected long tail latency for innocent flows, in some embodiments. Deadlock avoidance and recovery mechanisms may add to the complexity and latency in system 100 and/or system 200. Additionally, this may add to the switch complexity and power (e.g., requires more buffer and queues, etc.). In some embodiments, HPNT switches can drop packets when there is congestion in the network, as discussed above. End-to-end congestion control mechanisms and load balancing mechanisms can ensure that packet drops rarely occurs. When a packet is dropped, the switch can still send a header of the dropped packet to the destination, whereby the destination then sends a NACK message back to the source which retransmits the packet.

Still referring to FIG. 6, the streams within tunnel 110 (e.g., optimistic stream and scheduled stream) may include sequence numbers to determine packet reordering at the destination and/or for sending ACK and/or NACK messages. In some embodiments, TDST 213 ensures the at least one of the following reordering requirements: each stream packets are departed the network in the order they entered the network, and a scheduled tunnel packet cannot depart prior to departure of optimistic packets that enter the network before it.

In some embodiments, these two conditions guarantee that each flow's packets are delivered in order, even for large flows that use both streams, optimistic stream packets may not blocked by scheduled packets, and scheduled packets may not unnecessarily blocked by optimistic packets. In some embodiments, a source endpoint adds a stream sequence number to optimistic and scheduled packets respectively. In addition, each scheduled packet may carry the last optimistic sequence number that was used when it enters the network (e.g., the anchor sequence number, etc.). In some embodiments, the destination endpoint can ensure a stream packet departs the network in their arrival order and can ensure each scheduled packet does not depart the network before departure of the optimistic packet with its anchor sequence number.

Figure 7:
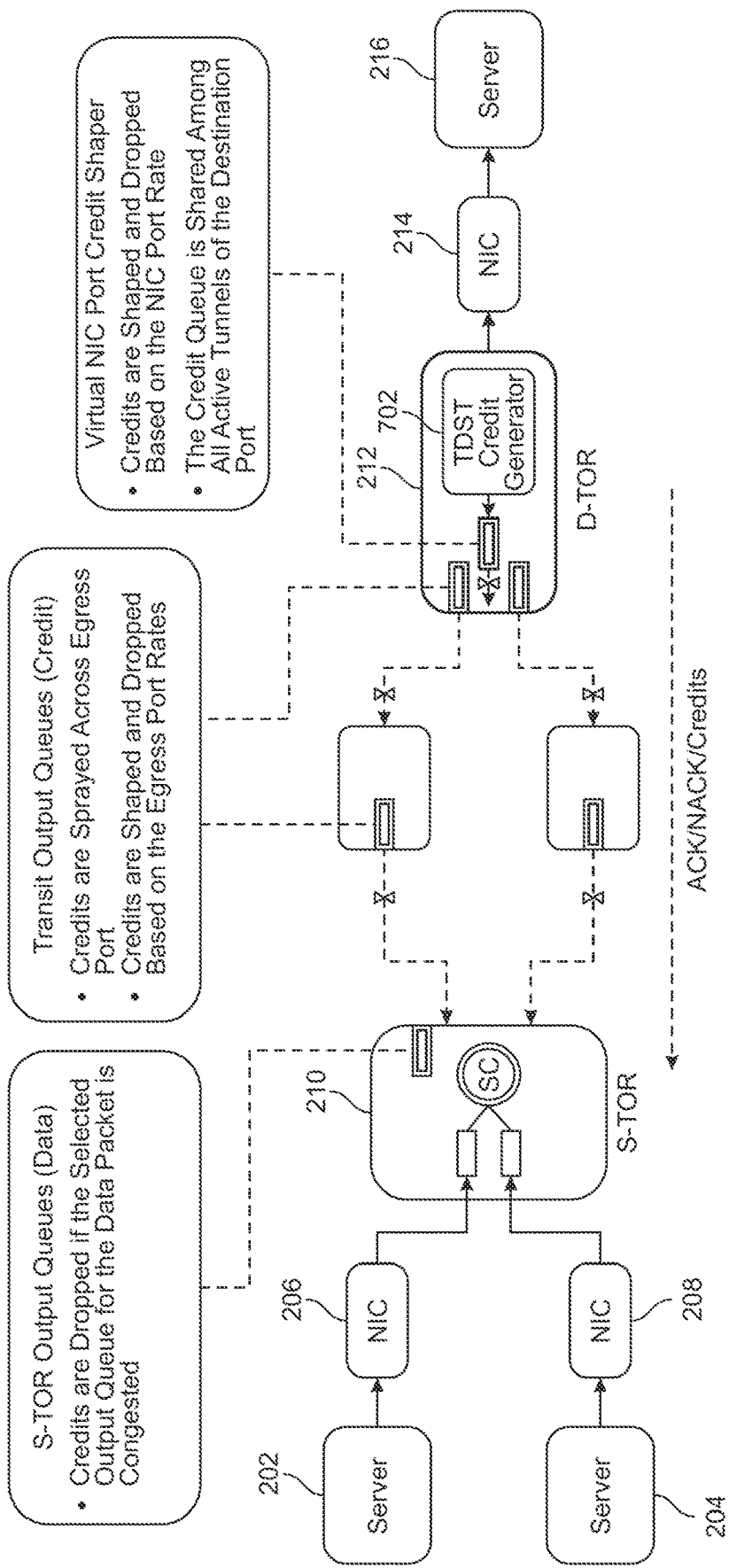
FIG. 7 is a diagram of a virtual tunnel that provides credits to a source, which can be implemented in the inter-network system of FIG. 1, according to some embodiments.

Referring now to FIG. 7, another implementation of system 200 is shown, according to some embodiments. FIG. 7 shows credits being provided from TDST credit generator 702 within D-ToR 212 to S-ToR 210. In some embodiments, the credits are shaped and/or dropped based on the port rate of NIC 214 (e.g., and other destination ports connected to tunnel 110, etc.). A credit queue can be shared among all active tunnels (e.g., flow paths, etc.) of the destination port. Credits may be provided across any and all egress ports and/or flow paths within tunnel 110. Once the credits reach S-ToR 210, the credits can be dropped if the selected output queue for the data packet is congested.

Figure 8:
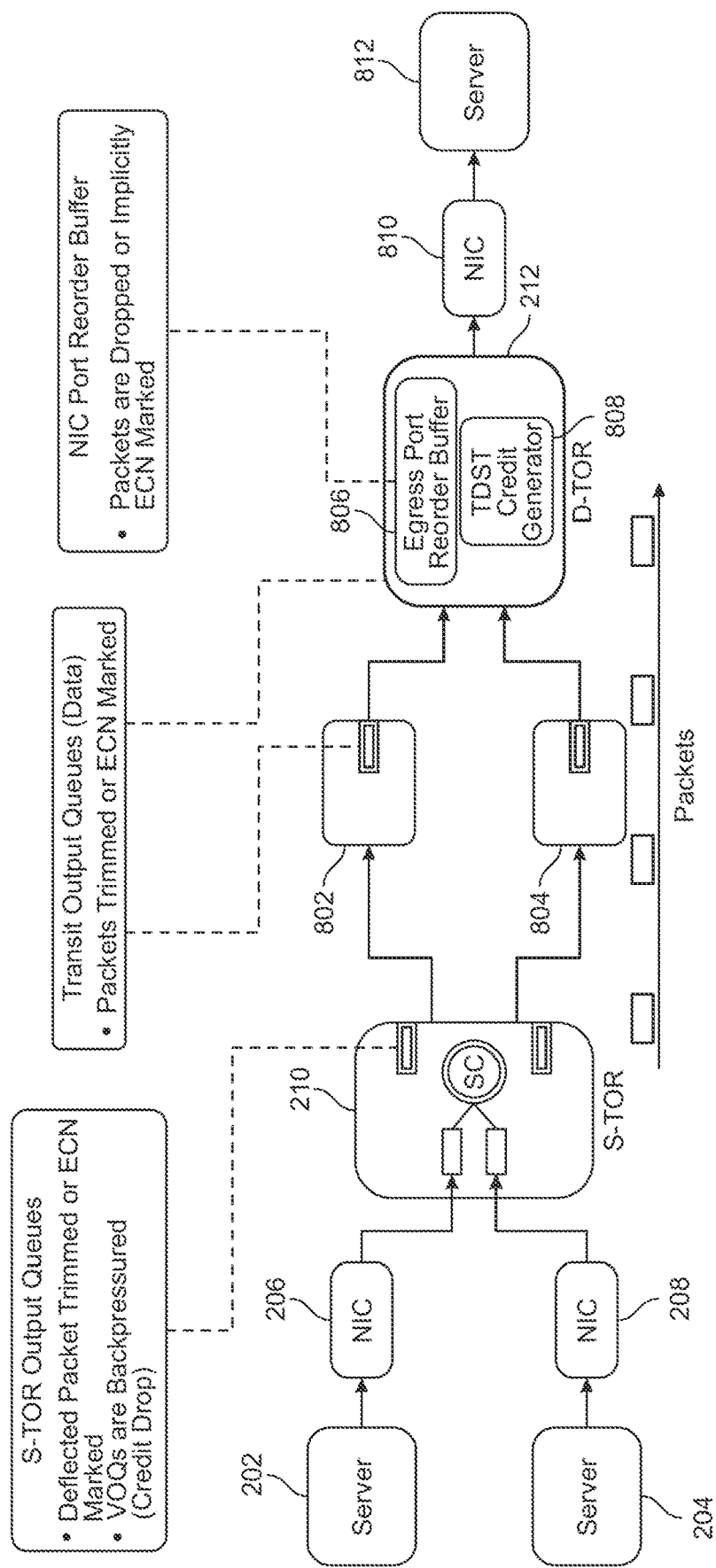
FIG. 8 is a block diagram of a virtual tunnel that provides packets to a destination, which can be implemented in the inter-network system of FIG. 1, according to some embodiments.
Figure 9:
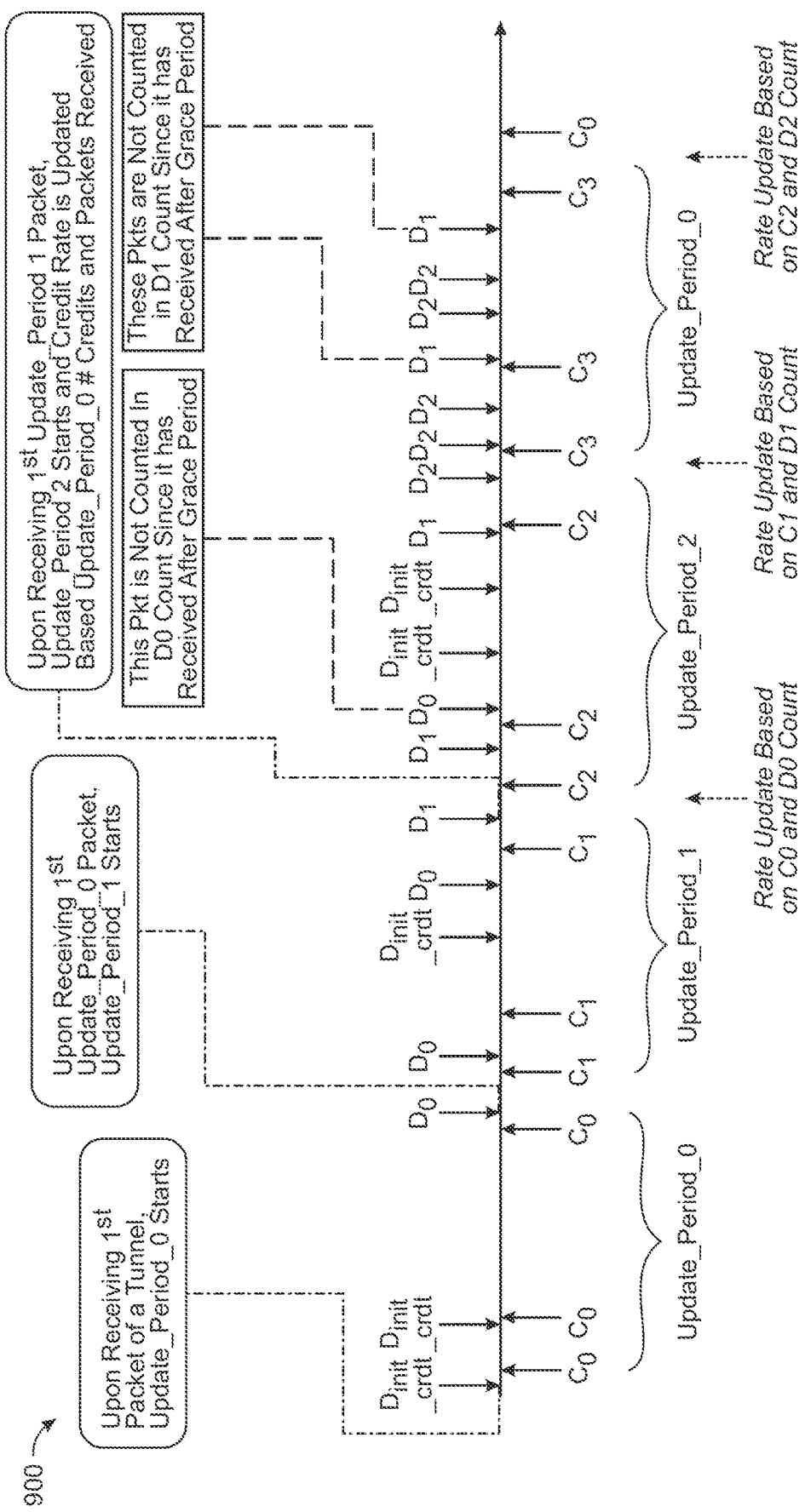
FIG. 9 is a timeline for credit generation, which can be implemented in the virtual tunnel of FIG. 7, according to some embodiments.

Referring now to FIG. 8, another implementation of system 200 is shown, according to some embodiments. FIG. 8 includes transit switches 802, 804, egress port reorder buffer 806, and TDST credit generator 808, NIC 810, and server 812. Referring now to FIG. 9, diagram 900 showing a timeline of credit generation, according to some embodiments.

Figure 10:
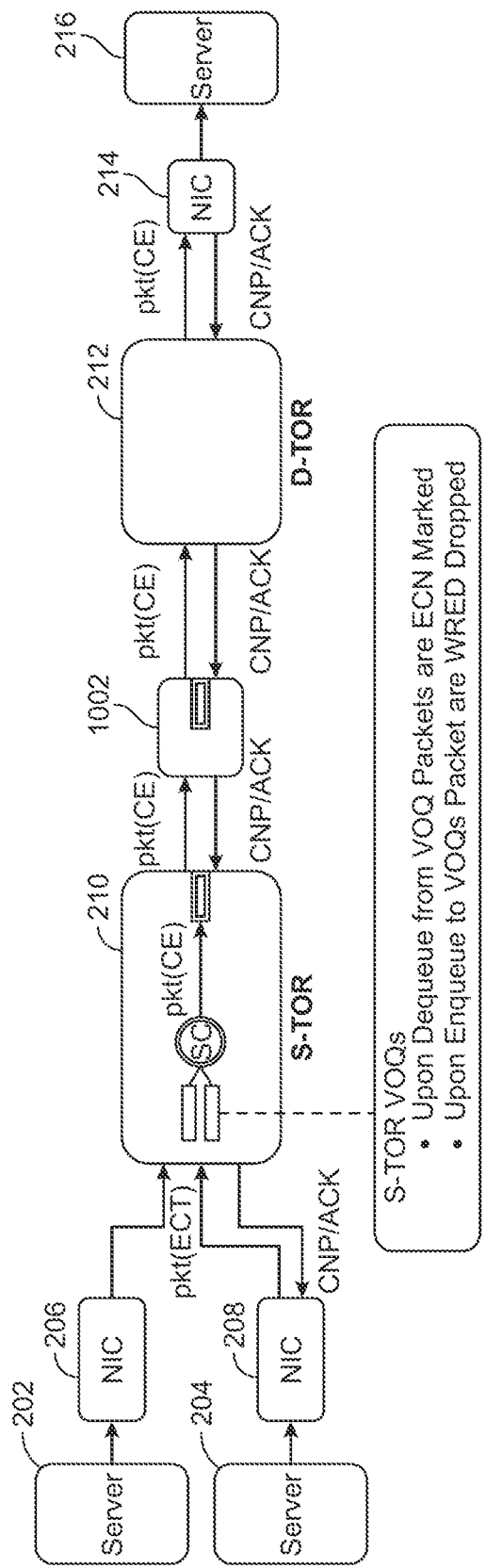
FIG. 10 is a block diagram of a system for congestion management, which can be implemented in the inter-network system of FIG. 1, according to some embodiments.

Referring now to FIG. 10, another embodiment of system 200 is shown, according to some embodiments. FIG. 10 is shown to include transit element 1002. In some embodiments, the system of FIG. 10 is configured to control a buffer side of S-ToR 210, provide flow-level fairness for large flows, enable configurable bandwidth split between short flows and long flows, provide fairness among ingress port NIC allocation of BW for short flows, and fairness among short flows from a NIC if necessary should be provided by the source NIC.

Figure 11:
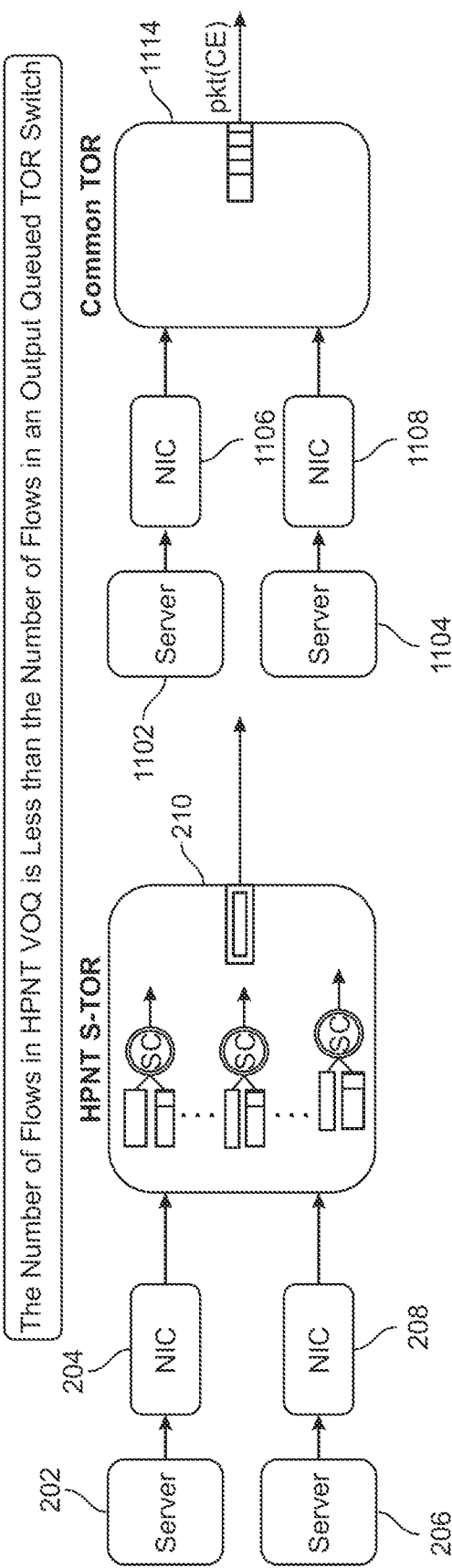
FIG. 11 is a block diagram of a system for congestion management, which can be implemented in the inter-network system of FIG. 1, according to some embodiments.
Figure 12:
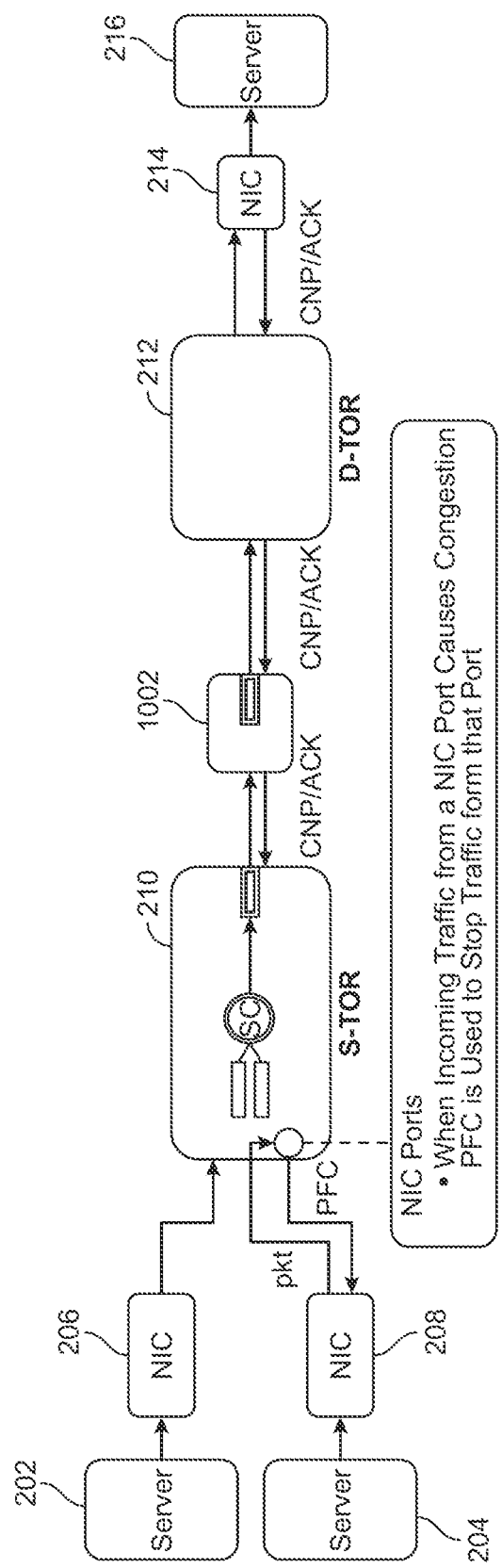
FIG. 12 is a block diagram of a system for congestion management, which can be implemented in the inter-network system of FIG. 1, according to some embodiments.
Figure 13:
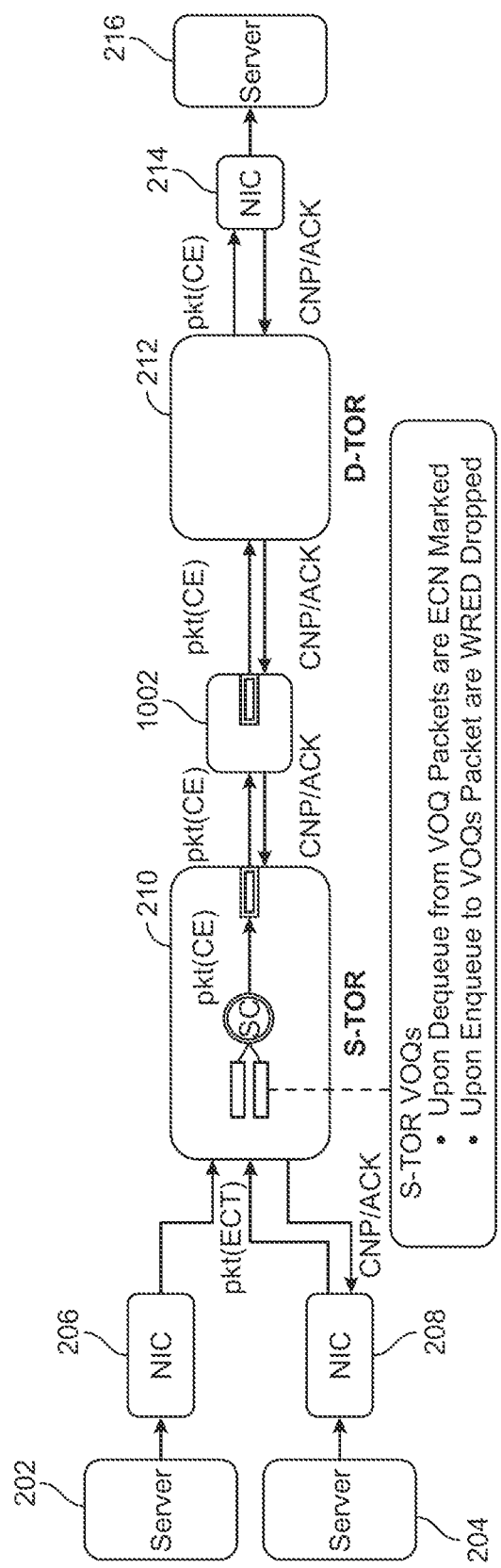
FIG. 13 is a block diagram of a system for congestion management, which can be implemented in the inter-network system of FIG. 1, according to some embodiments.
Figure 14:
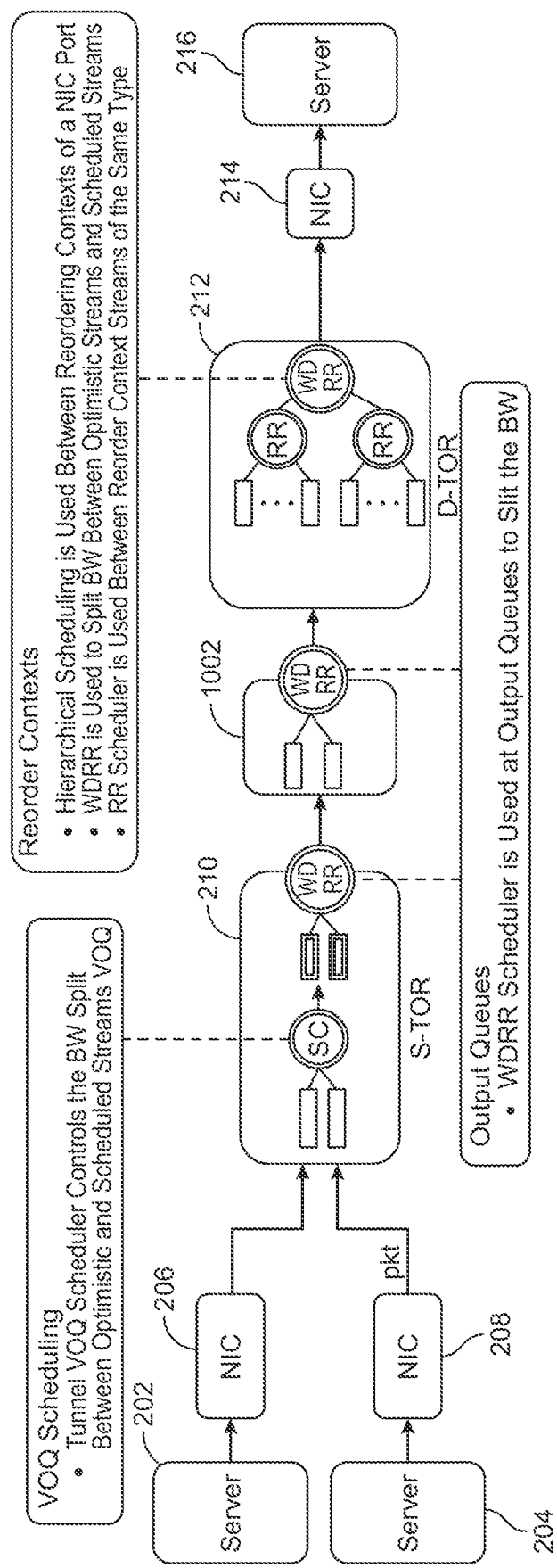
FIG. 14 is a block diagram for stream based queuing and scheduling, which can be implemented in the inter-network system of FIG. 1, according to some embodiments.
Figure 15:
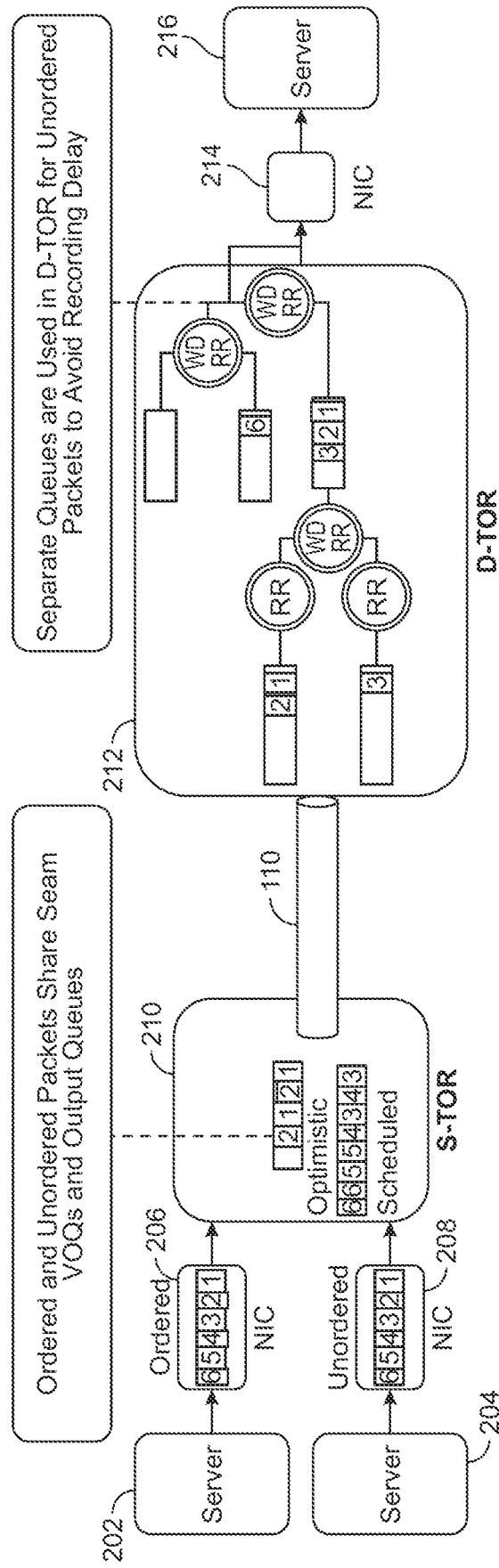
FIG. 15 is a diagram of a virtual tunnel for managing unordered packets, which can be implemented in the inter-network system of FIG. 1, according to some embodiments.

Referring now to FIG. 11, another embodiment of system 200 is shown, according to some embodiments. FIG. 11 is shown to include servers 11-2, 11-4, NICs 1106, 1108, and common ToR 1114. In some embodiments, tunnel 110 uses VOQ congestion management for scheduled VOQ that contains long flows. In some embodiments, the number of flows in HPNT VOQ is less than the number of flows in an output queued TOR switch. Referring now to FIG. 12, another embodiment of system 200 is shown, according to some embodiments. In some embodiments, when incoming traffic from a NIC port causes congestion PFC is used to stop traffic form that port.

Referring now to FIGS. 11-15, several other examples and implementations of system 200 and the implementation of tunnel 110 therein are disclosed, according to some embodiments. In network congestion management, congestion control update periods, credit generation rate updates, end switch endpoint functions, S-ToR congestion management, and support for unordered packets are all disclosed and contemplated within FIGS. 11-15.

The methods and processes disclosed herein may be performed by one or more devices (e.g., servers, processors, controllers, computers, etc.). For example, one or more devices may include communications interface and a processing circuit including a processor and a memory. The processing circuit can be communicably connected to the communications interface such that the processing circuit and the various components thereof can send and receive data via the communications interface. The processor can be implemented as a general purpose processor, an application specific integrated circuit (ASIC), one or more field programmable gate arrays (FPGAs), a group of processing components, or other suitable electronic processing components.

The communications interface can be or include wired or wireless communications interfaces (e.g., jacks, antennas, transmitters, receivers, transceivers, wire terminals, etc.) for conducting data communications. In various embodiments, communications via the communications interface can be direct (e.g., local wired or wireless communications) or via a communications network (e.g., a WAN, the Internet, a cellular network, etc.). For example, communications interface can include an Ethernet card and port for sending and receiving data via an Ethernet-based communications link or network. In another example, the communications interface can include a Wi-Fi transceiver for communicating via a wireless communications network. In another example, the communications interface can include cellular or mobile phone communications transceivers.

The memory (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present disclosure. The memory can be or include volatile memory or non-volatile memory. The memory can include database components, object code components, script components, or any other type of information structure for supporting the various activities and information structures described in the present disclosure. According to an example embodiment, the memory is communicably connected to the processor via the processing circuit and includes computer code for executing (e.g., by the processing circuit and/or the processor) one or more processes described herein.

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of various systems (e.g., system 100, system 200, etc.) and methods as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A method for managing network traffic, where a plurality of network devices each comprising a transmitter and receiver are connected through a network, the method comprising:
    establishing a virtual tunnel between a source endpoint and a destination endpoint, the virtual tunnel comprising a plurality of data flow paths, each of the plurality of data flow paths connecting the source endpoint and the destination endpoint, the source endpoint and the destination endpoint each being one of the network devices;
    receiving, from the destination endpoint, a plurality of credits at the source endpoint, the plurality of credits provided via two or more of the plurality of data flow paths;
    providing a plurality of data packets based on a data transmission sequence to the destination endpoint, wherein the data packets are provided in a first data stream for a second data stream are provided, wherein the first data stream is an optimistic stream provided without using credits and the second data stream is a scheduled stream provided in response to the credits and the optimistic stream uses a pull mode or a push mode based on a congestion state reported by the destination endpoint.

2. The method of claim 1, wherein the optimistic stream is used for first initial packets of each flow of high priority traffic, and the scheduled stream is used for low latency traffic and uses the credits to send low latency packets.

3. The method of claim 1, wherein the first data stream is provided in response to the credits until the destination endpoint provides an indication of congestion.

4. The method of claim 1, wherein the method further comprises:
    establishing the first data stream and the second data stream within the virtual tunnel;
    using the first data stream to provide a first subset of the plurality of data packets to the destination endpoint; and
    using the second data stream to provide a second subset of the plurality of data packets to the destination endpoint, wherein the second data stream provides the second subset based on at least one of the plurality of credits.

5. The method of claim 4, wherein the method further comprises:
    generating, at the source endpoint, a first virtual order queue (VOQ) for the first data stream and a second VOQ for the second data stream; and
    scheduling two or more data packets of the plurality of data packets into either the first VOQ or the second VOQ based on flow path criteria, the flow path criteria indicating at least one of a priority requirement or latency requirement for the two or more data packets, wherein the data transmission sequence comprises the first VOQ and the second VOQ.

6. The method of claim 5, further comprising:
    receiving, at the destination endpoint, the first subset and the second subset;
    reordering, at the destination endpoint, the plurality of data packets by combining the first subset and the second subset in an identical order from which the first subset and the second subset were provided.

7. The method of claim 5, further comprising:
receiving, at the destination endpoint, the first subset and the second subset;
reordering, at the destination endpoint, the plurality of data packets by combining the first subset and the second subset based on cross-stream reordering, wherein the cross-stream reordering is configured to notify the destination endpoint that the first subset is received prior to the second subset.

8. The method of claim 1, wherein the data transmission sequence comprises:
a transmission order for each of the plurality of data packets configured to be transmitted to the destination endpoint; and
a selected data flow stream of the plurality of data flow paths for each of the plurality of data packets.

9. The method of claim 1, wherein establishing the virtual tunnel comprises establishing the virtual tunnel within a pre-existing network, the pre-existing network operating under a pre-existing transport layer protocol.

10. A method for managing network traffic, where a plurality of network devices each comprising a transmitter and receiver are connected through a network, the method comprising:
establishing a virtual tunnel between a source endpoint and a destination endpoint, the virtual tunnel comprising a plurality of data flow paths, each of the plurality of data flow paths connecting the source endpoint and the destination endpoint, the source endpoint and the destination endpoint each being one of the network devices;
receiving, from the destination endpoint, a plurality of credits at the source endpoint, the plurality of credits provided via two or more of the plurality of data flow paths;
providing a plurality of data packets based on a data transmission sequence to the destination endpoint;
generating the plurality of credits at generation rate, the generation rate based on a port rate of a destination network interface controller (NIC), the destination NIC configured to receive the plurality of data packets from the destination endpoint and provide the plurality of data packets to a destination server;
determining that at least one credit received at the source endpoint is indicative of a non-congested data flow path of the plurality of data flow paths, wherein the at least one credit was provided to the source endpoint via the non-congested data flow path; and
providing at least one data packet of the plurality of data packets to the destination endpoint via the non-congested data flow path.

11. One or more non-transitory computer-readable media having computer-executable instructions stored thereon that, when executed by one or more processors, cause the one or more processors to perform operations comprising:
establishing a virtual tunnel between a source endpoint and a destination endpoint, the virtual tunnel comprising a plurality of data flow paths, each of the plurality of data flow paths connecting the source endpoint and the destination endpoint using a transmitter and receiver;
receiving a plurality of credits;
updating, at the source endpoint, a data transmission sequence based on the plurality of credits;
providing a plurality of data packets based on the data transmission sequence to the destination endpoint, wherein the data packets are provided in a first data stream and a second data stream, wherein the data packets for the first data stream is provided without waiting for credits, wherein the first data stream is an optimistic stream and the second data stream is a scheduled stream.

12. The media of claim 11, wherein further comprising:
generating the plurality of credits at generation rate, the generation rate based on a port rate of a destination network interface controller (NIC), the destination NIC configured to receive the plurality of data packets from the destination endpoint and provide the plurality of data packets to a destination server;
determining that at least one credit received at the source endpoint is indicative of a non-congested data flow path of the plurality of data flow paths, wherein the at least one credit was provided to the source endpoint via the non-congested data flow path; and
providing at least one data packet of the plurality of data packets to the destination endpoint via the non-congested data flow path.

13. The media of claim 11, wherein the method further comprises:
establishing the first data stream and the second data stream within the virtual tunnel;
using the first data stream to provide a first subset of the plurality of data packets to the destination endpoint; and
using the second data stream to provide a second subset of the plurality of data packets to the destination endpoint, wherein the second data stream provides the second subset based on at least one of the plurality of credits.

14. The media of claim 11, wherein the data transmission sequence comprises:
a transmission order for each of the plurality of data packets configured to be transmitted to the destination endpoint; and
a selected data flow stream of the plurality of data flow paths for each of the plurality of data packets.

15. The media of claim 11, wherein establishing the virtual tunnel comprises establishing the virtual tunnel within a pre-existing network, the pre-existing network operating under a pre-existing transport layer protocol.

16. The media of claim 11, wherein the optimistic stream is used for first initial packets of each flow of high priority traffic, and the scheduled stream is used for low latency traffic and uses the credits to send low latency packets.

17. The media of claim 11, wherein the scheduled stream uses a pull mode, and the optimistic stream uses the pull mode or a push mode based on a congestion state reported by the destination endpoint.

18. One or more non-transitory computer-readable media having computer-executable instructions stored thereon that, when executed by one or more processors, cause the one or more processors to perform operations comprising:
establishing a virtual tunnel between a source endpoint and a destination endpoint, the virtual tunnel comprising a plurality of data flow paths, each of the plurality of data flow paths connecting the source endpoint and the destination endpoint using a transmitter and receiver;
receiving a plurality of credits;
updating, at the source endpoint, a data transmission sequence based on the plurality of credits;
providing a plurality of data packets based on the data transmission sequence to the destination endpoint, wherein the data packets for a first data stream is provided without waiting for credits;

establishing the first data stream and a second data stream within the virtual tunnel;

using the first data stream to provide a first subset of the plurality of data packets to the destination endpoint;

using the second data stream to provide a second subset of the plurality of data packets to the destination endpoint, wherein the second data stream provides the second subset based on at least one of the plurality of credits;

generating, at the source endpoint, a first virtual order queue (VOQ) for the first data stream and a second VOQ for the second data stream; and scheduling two or more data packets of the plurality of data packets into either the first VOQ or the second VOQ based on flow path criteria, the flow path criteria indicating at least one of a priority requirement or latency requirement for the two or more data packets, wherein the data transmission sequence comprises the first VOQ and the second VOQ.

19. The media of claim 18, further comprising:

receiving, at the destination endpoint, the first subset and the second subset;

reordering, at the destination endpoint, the plurality of data packets by combining the first subset and the second subset in an identical order from which the first subset and the second subset were provided.

20. The media of claim 19, further comprising:

receiving, at the destination endpoint, the first subset and the second subset;

reordering, at the destination endpoint, the plurality of data packets by combining the first subset and the second subset based on cross-stream reordering, wherein the cross-stream reordering is configured to notify the destination endpoint that the first subset is received prior to the second subset, wherein the first data stream is an optimistic stream and the second data stream is a scheduled stream.

* * * * *